Feb. 25, 1969     E. J. DURBIN     3,429,178

MEASURING SYSTEM

Filed Jan. 7, 1965     Sheet _1_ of 2

INVENTOR.
ENOCH J. DURBIN

BY *Enoch J. Durbin*

3,429,178
MEASURING SYSTEM
Enoch J. Durbin, 246 Western Way,
Princeton, N.J. 08540
Filed Jan. 7, 1965, Ser. No. 423,936
U.S. Cl. 73—27          16 Claims
Int. Cl. C01n 31/00; G01r 17/10

ABSTRACT OF THE DISCLOSURE

A measuring system is provided having two measuring impedance elements each of which comprises an element of a normally balanced circuit configuration. These elements are differentially responsive to the condition to be measured but are equally responsive to ambient conditions. A feedback path from the output of one of the balanced circuit configurations is utilized to maintain both circuits in a balanced condition when unbalances are caused by a change in the ambient environment; however, changes in the condition to be measured will cause the feedback path to produce an uncompensated unbalance which may be sensed and indicated directly.

---

The present invention relates to measuring systems, and more particularly, to a new and improved measuring system for measuring physical quantities such as temperature, thermal conductivity, thermal energy, or the like, and also for measuring physical quantities which can vary temperature, thermal conductivity, thermal energy, or the like.

The prior art is replete with measuring systems for measuring the above-mentioned physical quantities, however, the problems and difficulties of such systems in regard to speed of measurement, stability and reliability of operation, the effect of ambient environmental conditions (temperature, humidity, etc.), and the effects due to changes in characteristics of electrical components, have continued.

Accordingly, it is an object of the present invention to provide a new and improved measuring system.

It is another object of this invention to provide a new and improved measuring system for measuring physical quantities such as temperature, thermal conductivity, thermal energy, or the like, and also for measuring physical quantities which can vary temperature, thermal conductivity, thermal energy, or the like.

A still further object of the present invention is to provide a new and improved measuring system characterized by, among other things, stability, reliability, freedom from the effect of ambient environmental conditions, and speed of operation.

Referring again to the prior art measuring systems, such systems use a reference element designed to compensate for zero shifts in the calibration by exposing the reference element to the ambient temperature. This method of compensation results in calibration slope changes with variation of ambient temperature.

This problem is overcome in the present invention by the use of the technique of "differential sensitivity," wherein two sensitive elements are made differentially sensitive to the physical quantity being measured while also being made equally sensitive to undesirable ambient environment variation.

A specific embodiment or measurnig system, included in the measuring systems for measuring the physical quantities mentioned above, is a system for measuring the combustibility of a gas mixture, sometimes referred to as combustible gas concentration monitors or systems. For the purposes of simplicity, clarity and brevity, the discussion and presentation of the present invention will be directed, primarily, to a system for measuring the combustibility of a gas mixture; however, it will be understood that the present invention is much broader in scope and not limited to any such one system and includes other specific embodiments, such as measuring systems for measuring temperature, incident thermal radiation, RMS voltage, vacuum pressure, the composition of a gas using thermal conductivity methods, and also, the specific embodiment of a mass flow meter which depends upon the differential variation of the rate of heat loss from two heated temperature sensitive elements. Limited presentations will be directed to various of the latter mentioned specific embodiments.

With regard to the specific embodiment of a measuring system for combustible gases or vapors, the explosive hazards associated with presence of fuels, hydraulic fluids, exhaust gases of guns and engines, industrial process gases, mine gases and other combustible gases or vapors, are well known and have been the subject of considerable research and attention in the past. The problem has become particularly acute in military and space applications due to the need for storing huge quantities of highly volatile fuel in the vicinity of hot engines; for further reference see "Design of an Apparatus for the Measurement of the Combustibility Hazard of Gases in Aircraft and Other Applications," by Mr. Enoch Durbin, to be found in the Aeronautical Engineering Review, April 1957, vol. 16, No. 4. Also, the problem has become increasingly severe in industrial applications due to the ever increasing numbers of electrical or electronic devices being utilized, any one of which can provide the source of ignition for any explosive gas mixture which might be present in the vicinity of such a device.

A measuring system, or combustible gas concentration monitoring system, to be effective, must be able to detect the presence of potentially explosive mixtures which are below their lower explosive limit. The lower explosive limit of any combustible gas being, of course, the minimum percentage of a combustible gas in a homogeneous mixture with an oxidizer which will propagate a flame when exposed to a suitable source of ignition. Obviously, if the detection of the presence of such potentially combustible mixtures can be made at a concentration or percentage below the lower explosive limit, remedial action can be taken well before the combustible gas reaches an accumulation or percentage equal to the explosive limit of the gas, and a possible disaster or catastrophy averted. Additionally, the system could be used to test or measure the effectiveness of venting systems or other safety apparatus intended to reduce explosive hazards.

It is then another object of the present invention to provide a new and improved combustible gas concentration monitoring system, for the detection of a potentially hazardous gas concentration at an accumulation or concentration below the lower explosive limit of such a gas.

In the past, many measuring systems have been developed for the detection and measurement of combustible vapors and gases. Some of the many physical or chemical detection systems which have been developed heretofore predicate their testing or measuring operation on: (i) chemical reactions occurring between the combustible gas and various chemical compounds, (ii) a change in pressure or volume of a gas sample when burned, (iii) the reaction of a gas on a catalyst involving a change in catalyst characteristics, such as electrical resistance or luminosity, or (iv) thermal conductivity changes which can occur in a gas mixture as its composition is altered.

Such prior art combustibility measuring systems generally tend to fall into one of two distinct categories, one that monitors characteristics directly related to a hazard producing condition, and one that monitors indirectly related characteristics.

The measuring systems included in the second mentioned category, while they may function in an adequately satisfactory manner for the majority of the hazardous conditions sought to be monitored, are inherently treacherous. For instance, a system for indicating the presence of toxic gases which monitors the color of the gas as an indication of toxicity, might fail completely in the presence of a colorless, yet highly toxic gas, or might give a fales indication upon the presence of a nontoxic, colorful gas.

Ideally, a measuring system or hazard monitor should monitor the characteristics of the phenomena under study which are directly, rather than indirectly, related to the hazard producing conditions. More specifically, if, for example, it is desired to test or measure the combustibility of a gas or vapor, the most direct and reliable test would be to expose the gas or vapor to a flame and observe the results. Obviously, for safety, such a test must be conducted with carefully metered quantities of gas and, in the event of a very rapid build-up or accumulation of such a gas or vapor, the system must have a response time sufficiently rapid to give an indication an extremely short time after such a test is conducted. This direct approach, as described above, is vitally important in order to prevent some unusual and unexpected combination of events from concealing or masking the presence of a hazardous condition, and, since the factors effecting a rapid build-up to a dangerous concentration are not always clearly predictable, the requirement of continuous monitoring accompanied by a rapid response or indication, is also vitally important.

Referring again to the priorly known measuring systems, or combustible gas monitoring systems, it appears that the most successful systems have been based on the principle that an electrically heated platinum, or platinum coated, resistor can become catalytic in the presence of combustible gases and can cause a chemical reaction between the constituents of the gases at temperatures well below the normal ignition temperatures of the gases, and at concentrations well below the lower explosive limit of such gases. The advantages derived from the use of the principle are numerous. The electrically heated platinum, or platinum coated, resistor can be used to create an effect which will occur before the gases have reached a point where explosive conditions are present, thus satisfying the first condition mentioned previously. Also, the use of the electrically heated platinum satisfies the condition that the measuring principle be related directly to the source of the hazard, since the gases or vapors are actually ignited on the surface of the electrically heated platinum, or platinum coated, resistor which becomes a catalytic sensor. Additionally, and very importantly, the reaction which occurs upon the gases being ignited from the surface of the catalytic filament is identical to the reaction which occurs in an explosion.

Thus it may be seen, in principle at least, that the utilization of the heated platinum, or platinum coated, resistor, as the basic sensing device in combustible gas monitoring systems, satisfies the aforementioned general requirements of a desirable safety hazard monitor. There are, however, certain limitations and problems associated with use of this principle which are particularly present in spacecraft, military and industrial applications. Many of the problems and limitations of the presently known testing and measuring systems, or combustible gas monitoring systems, are related to variations in the calibration of such systems, which calibrations can vary with temperature, humidity, pressure, and gas flow rate, and what is perhaps even more important, the serious problems, deficiencies and limitations imposed by such known systems are due primarily to their slow speed of response to a developing hazardous concentration of a gas or vapor.

Accordingly, a still further object of the present invention, is the provision of a combustible gas monitoring system which measures directly the characteristics of a potentially hazardous producing condition.

A feature of the present invention is the utilization of a temperature sensitive resistance element which is a catalyst, or which can be made catalytic by a suitable coating, and which operates below the lower explosive limit of the gas to be monitored.

Another object of the present invention is to provide a combustible gas monitoring system which monitors continuously for potentially hazardous conditions and which has a rapid response time for giving an indication of the development of such a potentially hazardous condition.

Accordingly, another feature of the present invention is continuous monitoring of the combustibility of a gas mixture or vapor coupled with the use of high gain, closed loop, feedback amplifiers and a rapid acting comparison system.

Other undesirable features of the prior art measuring systems for combustible gas mixtures, or other hazardous conditions, are that the zero adjustment for such systems is dependent on the ambient temperature and flow rate of the gas under test or measurement, and the need for electrically and thermally matched pairs of sensing elements.

Thus, it is still a further object of the present invention to provide a combustible gas monitoring system in which the zero adjustment of the included electrical circuit is independent of the ambient temperature and flow rate of the gas mixture without the requirement of precise, electrically matched pairs of sensing elements.

A related object of the present invention is to provide a circuit for use in a combustible gas monitoring system wherein the slope or calibration of the circuit, which is a function of the percentage of the lower explosive limit of the combustible gas mixtures, is also independent of the ambient temperature and flow rate of the system.

Yet another object of the present invention is to provide electrical circuit utilizing temperature sensitive elements for measuring the power of electrical signals of any wave shape without the need for complex calibration procedures and which is independent of ambient environmental conditions.

A further feature of the present invention is a unique measuring system utilizing a bridge circuit having a sensing element in one of the arms of the bridge circuit and a source of variable amplitude energizing voltage as the input to the bridge circuit, and which input is adjusted to provide a near balance condition of the bridge circuit whereby the electrical input to the bridge circuit is a measure of the rate of power loss of the sensing element.

In accordance with the immediately above-mentioned feature, one embodiment of the present invention is a bridge circuit in which one of the arms includes a resistance element, preferably a thermistor type semi conductor, wherein the heat input due to catalytic combustion on the surface of the semi-conductor is the main independent variable being measured. The sensor is exposed to a variable energy source, such as for example, by residing in a combustion chamber of a gas sampling system. An amplifier is provided, the input of which is the output of the bridge circuit, and the output of the amplifier is connected to the input of the bridge circuit to form a feedback circuit. The sensor, or negative resistance semiconductor, is chosen such that, when the heat of combustion is the dependent variable being measured, the sensor is much more sensitive; for example, 100 or more times, to the heat energy of combustion than the other resistance arms of the bridge circuit. The input to the bridge circuit at its balanced condition, is a measure of both the quantity desired to be measured and the ambient environmental conditions.

The measuring system can be made independent of the ambient environment conditions by providing a second bridge circuit which is substantially identical to that of the first bridge circuit. The second bridge circuit is energized from the output of the amplifier energizing the first bridge circuit. The amplitude of the amplifier output is determined by the power required by the temperature sensitive arm of the first mentioned bridge to keep the same nearly in balance. If both bridge circuits are kept in the same ambient environment, the second bridge circuit will remain balanced at all ambient environmental conditions and thus the balance is independent of the ambient temperature. However, the input to the first bridge circuit will also vary with the heat input due to the sensor, or resistance element or semiconductor, being exposed to the combustible gas mixture undergoing testing or measurement, and the current flowing in the temperature sensitive arm of the second bridge circuit will be insufficient to balance the second bridge circuit when the temperature sensitive element of the first bridge circuit is exposed to the combustible gas mixture. Accordingly, the degree of unbalance in the second bridge circuit is a direct measure of the heat of combustion of the gas to which the heat sensitive element of the first bridge circuit has been exposed.

The calibration or slope of the output characteristic of the second bridge circuit, however, would change in direct relationship with the ambient temperature and gas mixture flow rate. This is due to the fact that the excitation of the second bridge circuit is proportional to the change of the ambient temperature, and gas mixture flow rate.

This would-be deficiency, is eliminated by still another feature of the present invention, which is the provision of a second feedback loop which extends from the output of the second bridge circuit to the input thereof. Thus, the input power to the second bridge consists of two parts. The first part, governed by the first bridge circuit, provides power to compensate for changes in the environment to which the first bridge circuit has been exposed. The second input to the second bridge is governed by the second bridge circuit and provides power proportional to the difference in the environment to which the first and second bridge circuits have been exposed. With this arrangement, the output of the second bridge circuit is a direct measure of the unknown variable energy source, such as the heat of combustion of a gas mixture, to which the sensors of each of the bridge circuits have been exposed. Furthermore, the output of the second bridge circuit has a calibration which is independent of the ambient temperature of the environment and of the flow rate of the gas mixture.

The effect of the double bridge circuit arrangement, in general, is to keep the sensor associated with each bridge circuit at approximately a constant actual temperature. If the loop gain of both bridge circuits is made efficiently high, for example 100 more or less, the calibration of such a system will be a linear function of the power changes caused by the quantity to be measured and will be also independent of the fact that the resistance of the sensitive arms of the bridges can be very nonlinearly dependent on temperature. The normal errors due to hysteresis, zero shift, and time lag of the sensitive elements or sensors, will be diminished, by the feedback, to a very small value, for example 1/100 more or less of the open loop values. In use, the system can be calibrated for any particular combustible gas expected, and the calibration will be essentially constant for a large series of petroleum hydrocarbons.

When the present invention is utilized to measure the energy of combustion of an unknown gas, the direct measure of such energy is made simply by reading, recording, or otherwise noting, the feedback voltage of the second bridge circuit. In various embodiments of the present invention, either or both of the feedback voltages can be AC voltages or DC voltages.

In supplementation of and in addition to the foregoing objects and features, the present invention will provide the following advantages:

(1) It will provide a high speed of measurement by use of a feedback system.

(2) It will provide a constant temperature sensing element for increased stability and reliability of operation.

(3) It will provide a calibration relatively independent of the electrical properties of the sensing element.

(4) When thermistor sensing elements are used the need for high gain amplifiers will be minimized.

(5) When used as a direct current system the invention will provide simplicity and economy in the use of electric input power to perform the measurement.

(6) As a combustibility analyzer, use of a platinum catalyst will permit operation at less than the lower explosive limits. The system principle involving the use of differentially catalytic elements will provide compensation to make the system relatively independent of ambient temperature and humidity of the sample gas and the flow rate of the sampling system.

(7) The use of differential sensing in measuring temperature, thermal conductivity, thermal energy, or the like, or for measuring physical quantities which can be made to vary temperature, thermal conductivity, thermal energy or the like, will provide compensation to make the system relatively independent of ambient environmental conditions.

(8) The use of feedback will make the measurement system relatively independent of changes in characteristics of the electrical components of the system including the basic power supply required to operate the system.

A more complete understanding of the present invention may be had by considering the following detailed description in conjunction with the appended drawings wherein.

Figure 1:
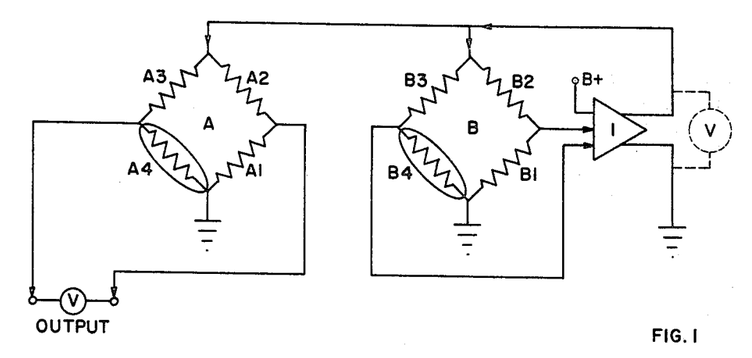
FIGURES 1 is a diagram of one embodiment comprising two bridge circuits, a feedback lop and only one amplifier.
Figure 5:
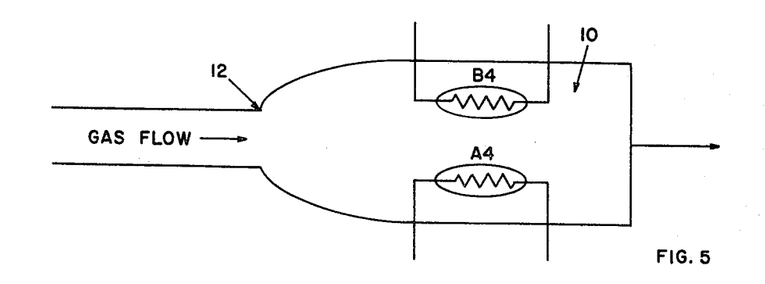
FIGURE 5 is a schematic drawing showing a portion of the combustion chamber of an associated gas sampling system, within which resides the sensors of the bridge circuits.
Figure 6:
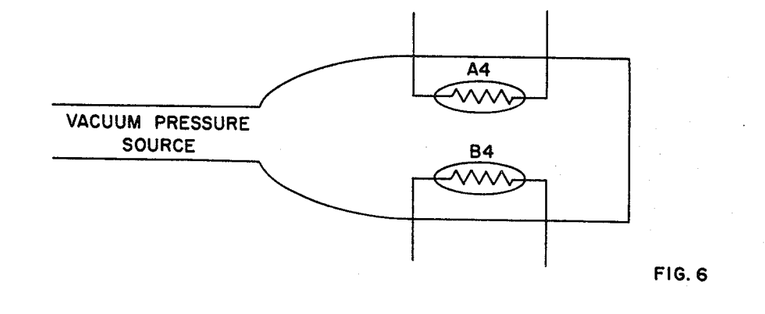
FIGURE 6 is another schematic drawing showing a portion of a vacuum chamber of a vacuum measuring system in which reside the sensors of the bridge circuits.

Referring now to FIGURE 1, there is shown one preferred embodiment of the present invention which includes two substantially identical bridge circuit arrangements, designated bridge circuits A and B. Bridge circuit A has three resistance arms $A_1$, $A_2$, and $A_3$, and bridge circuit B has three resistance arms $B_1$, $B_2$, and $B_3$, which may be comprised of precision type resistor components, any one of several types well known to the art and commercially available, which have a fairly stable resistance-temperature characteristic, i.e., the resistances included in the arms having relatively insensitive responses to variation of temperature of the resistor. The fourth arm of bridge circuit B includes a sensing element $B_4$, which may be, for example, a semiconductor thermistor, such as shown in FIGURE 5, which has been platinum coated to make it catalytic for combustible gas. The fourth arm of bridge circuit A includes a sensor $A_4$, also, for example, a semiconductor thermistor, which is less catalytic than the other sensor $B_4$. Sensor $A_4$ can, for example, be not platinum coated at all or can be suitably coated to assure that it is less catalytic than sensor $B_4$, e.g., coated with less platinum. Thus it will be understood, that the sensors are made differentially sensitive to the physical quantity being measured, or in this embodiment, combustible gas mixture. Sensors $A_4$ and $B_4$ are chosen such that their variation with temperature, as compared with the temperature variation of the components in the other arms of the bridge circuits is for example, 100 times or more greater. The sensors $A_4$ and $B_4$ are encircled to aid in their distinguishment from the other elements.

The energizing input terminals to bridge circuit B, as may be seen in FIGURE 1, are located at the juncture of resistance arms $B_2$ and $B_3$, and at the juncture of resistance arm $B_1$ and sensor $B_4$. The energizing input terminals to bridge circuit A are located at the juncture of resistance arms $A_2$ and $A_3$, and at the juncture of resistance arm $A_1$ and sensor $A_4$. As shown in FIGURE 1, the latter mentioned junctures of each bridge circuit are grounded.

The output terminals of bridge circuit B are located at the juncture of resistance arms $B_1$ and $B_2$, and at the juncture of resistance arm $B_3$ and sensor $B_4$. Similarly, the output terminals of bridge circuit A are located at the juncture of resistance arms $A_1$ and $A_2$, and at the juncture of resistance arm $A_3$ and sensor $A_4$.

An amplifier 1, having a variable output, is driven by the voltage developed across the output terminals of bridge circuit B and the output of the amplifier is connected to the energizing input terminals of both bridge circuits, with one side of each connection grounded as shown. The amplifier 1 may be any one of several amplifiers known in the art and commercially available and, it will be understood, that the present invention is in no way limited to or predicated upon any particular amplifier configuration. Such a suitable amplifier must, of course, have certain basic characteristics which are provided by many different detailed amplifier configurations. The amplifier must have sufficient power to heat the temperature sensitive element, or sensor, to a temperature at which its electrical resistance permits its associated bridge to be balanced. The bridge circuit and amplifier can operate using DC voltage only and can be operated using AC voltage only. One such commercially available, suitable amplifier is Amplifier Model No. 113 manufactured by Zetex, Inc., 2380 Willow Path Road, Concord, Calif.

The gas sampling system 12, shown in FIGURE 5, may be any one of several such systems well known to the art, and it will be understood, that the present invention is in no manner limited to, or restricted to, use or assocciation with any such gas sampling system.

Sensors $A_4$ and $B_4$, as shown in FIGURE 5, reside within the combustion chamber 10 of the partially shown gas sampling system 12, and the sensors are then electrically inter-connected to their respective bridge circuits by suitable wiring or other electrical inter-connections.

The sensors $A_4$ and $B_4$ may be any one of several thermistors known to the prior art, and commercially available, which are more sensitive to heat, for example, than the above-mentioned precision type resistor components located in the other arms of the bridge circuits. Such thermistors should have a resistance variation with temperature which is in the order, more or less, of from 100 or more times more sensitive than the aforementioned precision type resistor components. The temperature-impedance or resistance characteristics of the semiconductor material comprising sensors $A_4$ and $B_4$ are well known. Thus when the present invention is operating as a system for measuring the combustibility of a gas, and the sensors are exposed to a flow of such gas, a chemical reaction will occur, between the constituents of the gas, on the surface of the sensors, and since one sensor, $B_4$ in this embodiment, is made more catalytic than the other, the sensors will react differentially with the gas and the more catalytic sensor will become more heated and hence its impedance or resistance will vary, increase or decrease a greater amount, than the other sensor, sensor $A_4$ in this embodiment, which is less catalytic. Thus it can be said that the sensors are exposed to the combustible gas mixture and the differential reaction is related directly to the combustibility being measured, or in the broader sense of the invention, to the physical quantity being measured and the differential reaction is related directly to the physical quantity being measured. It will be understood that the present invention is not limited to the use of any such thermistors, but rather the spirit and scope of the present invention is such that whatever the physical quantity to be measured, the sensors, or sensing elements, utilized will be similarly more sensitive to the physical quantity to be measured, the sensors, or sensing elements, utilized will be similarly more sensitive to the physical quantity to be measured than the elements included in the other arms of the bridge circuits.

With further regard to the differential sensitivity of sensors $A_4$ and $B_4$, it will be understood that "differential sensitivity" includes both where the comparative degrees to which the sensors are made catalytic are different when both are measured from an arbitrarily chosen zero, and where one sensor is made catalytic and the other is not made catalytic.

The thermistors $A_4$ and $B_4$, in the preferred embodiment shown in FIGURE 1, will as aforesaid, reside in the combustion chamber 10 of FIGURE 5, and hence initially the impedance or resistance of the thermistors will be related to their temperature which is determined by the heat produced in the thermistors due to the current passing through them, or voltage applied thereto by the amplifier 1, and the heat supplied to the thermistors or sensors due to the heat reaction combustion of gas, on the surfaces of the sensors within the combustion chamber 10, and the heat lost to the environment.

Many experimental studies have been made of the platnium or platinum coated, filament temperature vs. combustible gas concentration relationships. It has been found that, if a suitable source of combustible gas mixture, such as propane and air, is supplied to a cell containing a platinum filament heated electrically to a temperature which is less than approximately 200° C., no increase in filament temperature occurs, as the proportions of propane and air are changed. However, if the initial temperature is raised to 300° C., it is found that the temperature varies linearly with the percentage of propane in the mixture, until the lower explosive limit is reached. Above the lower explosive limit, the rate of increase in temperature decreases until the point of maximum flame propagation is reached. Beyond this value of combustible gas, the temperature of the filament starts to decrease due to increased thermal conductivity of the gas. As the temperature of the filament, prior to the introduction of a combustible gas, is raised beyond 300° C., the increase in filament temperature due to the introduction of combustible gas increases until an initial temperature of about 350° C. to 400° C. is reached. Beyond this temperature, no further increase in slope occurs.

It has been noted that the reaction at the surface of the platinum takes place at a temperature which is well below the normal ignition temperature of the gas mixture. Because of this, the initiated combustion will not generate sufficient heat to raise the temperature of the adjacent layers of gas or vapor to their ignition point. Further combustion will only take place with those molecules of gas which come in contact with the platinum catalyst.

Thus, the input to the bridge circuit, at its balanced condition which may for example be determined by the use of any suitable volt meter in the manner well known to the art, will be a measure of both the heat of combustion of the combustible gas mixture within the chamber 10, and also the ambient temperature, or environmental condition.

The measuring system of FIGURE 1 can be made independent of the ambient environmental condition, or ambient temperature in the present example, by the provision of the second bridge circuit, bridge circuit A, which is substantially identical to the first bridge circuit, bridge circuit B. As may be seen in FIGURE 1, bridge circuit A is energized from the output of amplifier 1 whose output, as described above, has its amplitude determined by the power required to keep bridge circuit B in balance when the sensor $B_4$ is subjected or exposed to a change in temperature as described above.

If both bridge circuits are kept in the same ambient environment, the second bridge circuit will remain balanced at all ambient environments and the balance is independent of the ambient temperaure. However, since the dependent of the ambient temperature. However, since the to the chemical reaction on the surface of sensor $B_4$, the current flowing through sensor $A_4$ of bridge circuit A, will be insufficient to balance bridge circuit A when sensors $B_4$ and $A_4$ are differentially sensitive to the combustible gas mixture within the combustion chamber 10. Thus, the degree of unbalance in bridge circuit A is a direct measure of the heat of combustion of the combustible gas or vapor to which both sensors has been exposed. This unbalanced condition, may be detected in any one of a number of suitable means well known to the art such as, for example, a conventional volt meter as shown in FIGURE 1.

The calibration or slope of the output characteristic of bridge circuit A, as described so far, will however change with the ambient temperature. This is due to the fact that the excitation of bridge circuit A is proportional to both the change in ambient temperature and the heat of reaction.

Figure 2:
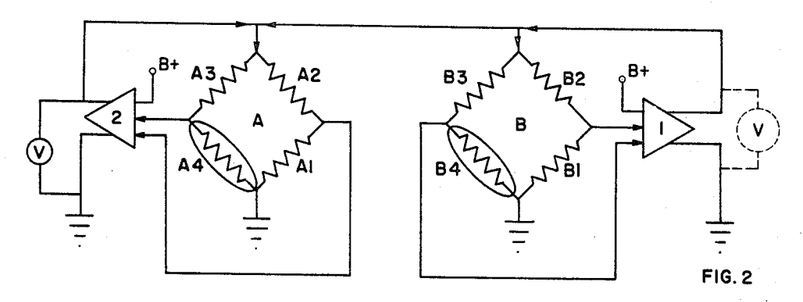
FIGURE 2 is a diagram of another embodiment of the present invention including two bridge circuits, two feedback loops and two amplifiers.

In accordance with another aspect of the present invention, this possible deficiency, due to the change of calibration or slope of the output characteristic of bridge circuit A, can be eliminated, as shown in FIGURE 2, by the provision of a second amplifier and feedback loop. The system shown in FIGURE 2, is substantially the same as shown in FIGURE 1, with the exception of the addition of the last mentioned provisions, viz., amplifier 2, the input being connected to the output of bridge circuit A, and the output of the amplifier being connected by the feedback loop to the input of bridge circuit A. With the arrangement, the input power to bridge circuit A consists of two parts, the first part from bridge circuit B and being of sufficient magnitude to compensate for changes in the environment to which bridge circuit B has been exposed, and the second part, from amplifier 2, and being proportional to the differential sensitivity in the environment to which the bridge circuits A and B have been exposed. Accordingly, the output of bridge circuit A as described in FIGURE 2, will be a direct measure of the heat of combustion reacting differentially on sensors $A_4$ and $B_4$ within the combustion chamber 10, and also, the output will have a calibration which is independent of the ambient temperature of the system, and the flow rate of the gas within the sampling system 12 shown in FIGURE 5, because both sensors $A_4$ and $B_4$ are equally sensitive to the temperature of the gas and the flow rate of the gas within the sampling system 12.

The effect of the double bridge arrangement shown in FIGURE 2, is to keep the sensors of both bridge circuits at approximately a constant operating temperature and, if the loop gain of both bridge circuits is sufficiently high, for example 100 more or less, the calibration of the system will be a linear function of the power changes caused by the quantity to be measured.

It will be further noted, that the system shown in FIGURE 2 provides for the summation of the electrical power applied to sensor $A_4$, due to the output of both amplifiers 1 and 2 and the system provides for the isolation of the output of amplifier 2 from sensor $B_4$. This, isolation is as well known to the art, can be accomplished in many ways, for example, one amplifier can be of AC operation, and the other amplifier can be of DC operation, and the use of electrical filters to isolate the output of amplifier 2 from the sensor $B_4$.

It will be understood and is manifest, that numerous modifications may be made in the preferred embodiments of FIGURES 1 and 2, without departing from the spirit and scope of the present invention. For example, the first bridge circuit can, in another embodiment, become an oscillator with its frequency being determined by tuned elements in the first amplifier. Such an oscillator would provide a double function, namely, (1) the heating power of the oscillator would drive both bridge circuits to a balanced condition and (2) the alternating voltage associated with such an oscillator would provide a measuring signal for determining the degree to which bridge B would be unbalanced. The AC voltage output of such a bridge would then be amplified by the amplifier-oscillator and, thus, self-regulation would be achieved. Such AC voltage would then also supply the power for an associated bridge circuit A. The output of bridge circuit A would then be amplified by means of a suitable AC amplifier. The output of a second amplifier would then be rectified and fed back to the associated bridge circuit A, which rectified voltage would then be suitable for the aforementioned measuring or monitoring purposes.

Another modification, could include a separate low power oscillator to be used to power both bridge circuits for measurement purposes. In such an arrangement, the AC output of bridge circuit B would then be amplified by amplifier 1. The output of the first amplifier would then be rectified and fed back to bridge circuit B to balance bridge circuit B. The same rectified output voltage would then be applied to bridge circuit A to achieve a partial balance in bridge circuit A. The unbalanced condition of bridge circuit A would be represented by the AC voltage developed at the output of bridge circuit A which would then be amplified by amplifier 2, and the output of amplifier 2 would then be rectified and fed back to the sensor $A_4$ of bridge circuit A.

In these suggested modifications, the rectifier can be a phase sensitive (synchronous) rectifier which maintains a high signal to noise ratio in the amplifier. The amplifier again should be in the order of 100, more or less, since as the amplifier gain is increased, the balance of the bridge circuit is improved at the expense of additional problems associated in the stability of the feedback circuit. The maximum gain depends on the phase shift associated with the various bridge circuit elements and amplifier components.

Figure 3:
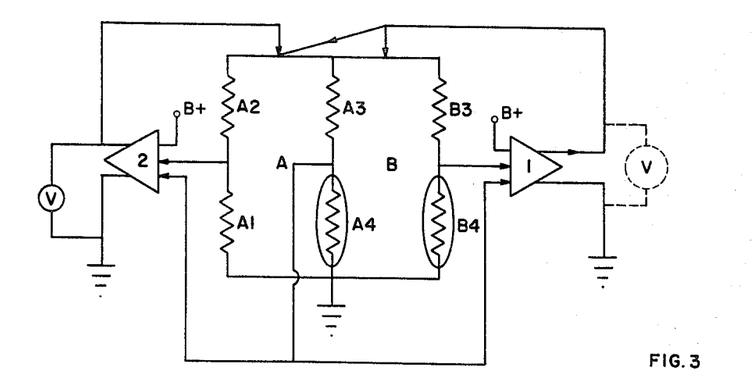
FIGURE 3 is a diagram of still another embodiment of the present invention and shows a complex bridge which may replace two separate bridges and which includes two feedback loops and two amplifiers.

Referring now to FIGURE 3, there is shown another embodiment of the present invention wherein the eight arms of the two bridge circuits of FIGURES 1 and 2 have been replaced by the six arms of a more complex bridge. Bridge circuit B has two resistance arms $A_3$ and $B_3$, and two sensor arms $A_4$ and $B_4$. Bridge circuit A has three resistance arms $A_1$, $A_2$, and $A_3$ and sensor $A_4$. The characteristics of the bridge circuit elements being the same as the corresponding ones previously described and shown in FIGURES 1 and 2. In this preferred embodiment of the present invention, the power required to operate the complex bridge is reduced by the corresponding reduction in components and the gain required of amplifier 1 is also reduced. Also, in this form of the invention, the output of amplifier 1 provides electrical power to sensor $A_4$ and $B_4$, and amplifier 2 provides electrical power to sensor $A_4$. The output terminals of bridge circuit B are located at the juncture of resistor $B_3$ and sensor $B_4$, and at the juncture of resistor $A_3$ and sensor $A_4$. The output terminals of bridge circuit A are located at the juncture of resistor $A_3$ and sensor $A_4$, and at the junction of resistors $A_1$ and $A_2$. The input terminals of bridge circuits A and B are located at the junctures of resistors $A_2$ and $A_3$ and resistors $A_3$ and $B_3$, and at the juncture of resistor $A_1$ and sensors $A_4$ and $B_4$. The summation of the electrical power from amplifiers 1 and 2, occurs in sensor $A_4$.

Figure 4:
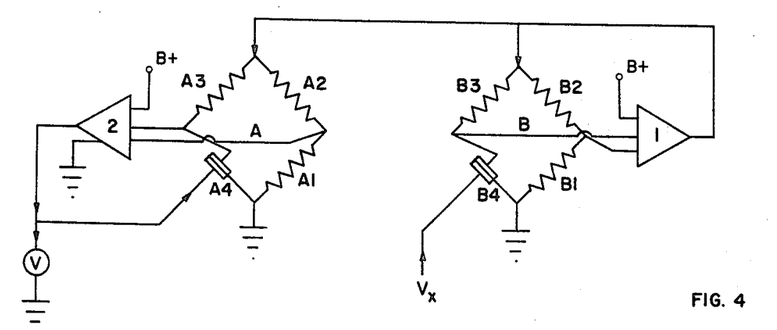
FIGURE 4 is another diagram of yet another embodiment particularly arranged to measure an unknown voltage, also known are sensors composed of two parts.

The present invention could also function or be operated as a voltage measuring system. In being so operated, sensor $B_4$ in FIGURES 1, 2, and 3, is exposed or subjected to a source of unknown voltage to be measured, rather than to heat of chemical reaction as in the previous embodiment for measuring the combustibility of a gas. FIGURE 4 discloses a voltage measuring embodiment of the present invention, wherein sensors $A_4$ and $B_4$ have been modified to facilitate the summing of the heating power of the voltage to be measured and voltages generated by the measuring system. Sensors $A_4$ and $B_4$ are comprised, as shown in FIGURE 4, of two parts which are mechanically and thermally intimately joined but which are separated by an electrical conducting layer which provides a common energizing terminal for each part of the element. With such sensor construction, amplifiers may both be either of AC operation, or DC operation, and hence the amount of electrical power supplied to sensor $A_4$, by amplifier 2 is readily determinable by measuring the voltage as power supplied to the left part of the sensor $A_4$, as shown in FIGURE 4, by amplifier 2. Similar to the previous embodiment, the amount of voltage or power supplied by amplifier 2 to bridge circuit A, to rebalance circuit A after both circuits have been unbalanced due to sensor $B_4$ being exposed or subjected to a source of unknown voltage $V_x$ and accordingly experiencing a variation in impedance due to the variation in the temperature or a result of the application of $V_x$, is a direct measure of the amount of $V_x$.

Still another embodiment of the present invention is a measuring system of thermal radiation. In this form of the invention, one of the sensors, for example $B_4$, is exposed to a source of incident thermal radiation energy which is to be measured. The second sensor, for example $A_4$, is exposed to the same ambient environment as sensor $B_4$, but such sensor $A_4$ is not exposed to the source of incident thermal radiation. Alternately, in this embodiment of the invention, both sensors are exposed to the same ambient environment but each sensor would be exposed to a different fraction of the incident thermal radiation energy. Upon the occurrence of such differential exposure, this embodiment of the present invention then operates in the same manner as the two previously described embodiments to provide a measure of the incident thermal radiation.

The present invention is also embodied as a thermometer for measuring the temperature of a fluid at low density where the time constant of most measuring systems is excessively long, i.e., the thermal time constant of a very small bead thermistor thermometer for measuring free air temperature at 100 kilometers altitude can be of the order of 700 seconds.

This long time constant will result in very large measurement errors if the measurement is made from a rocket or other platform which is moving rapidly through the atmosphere, or if the temperature of the atmosphere is not constant when the measurement is made from a fixed platform in space.

A second disadvantage of present methods for measuring the temperature of a fluid at low densities is the considerable errors which arise due to the relative motion of the sensor with respect to the fluid. This disadvantage takes two forms. One is the change in heat transfer rate as a function of velocity which appears as both a change of time constant of the sensor as well as a change of calibration constant. Another disadvantage is due to the heat flux into the sensor when the kinetic energy of the fluid is converted into thermal energy by the stagnation of the fluid at the leading surface of the sensor.

Both of these disadvantages are minimized by the thermometer embodiment of the present invention.

The long time constant disadvantage is reduced by the use of the feedback voltage to the sensor, while the calibration variation with changes in relative velocity of sensor and fluid is minimized by the use of the differential sensitivity of both sensors to the temperature of the fluid as will be apparent from the following discussion and presentation.

The measuring system in this embodiment utilizes, as before, the two sensors, $A_4$ and $B_4$ in FIGURES 1 to 3, inclusive.

The power balance equation for element $A_4$ would be $$V^2 = K(T_1 - T)$$

where V is the voltage applied to the element $B_4$;
where K is a calibration constant dependent on relative velocity of the sensor and the fluid;
where $T_1$ is the temperature of the element $B_4$ at balance;
where T is the temperature of the ambient environment which is to be measured.

The power balance equation for element $B_4$ would be $$\frac{V^2}{R_1} + \frac{V_o^2}{R_1} = K(T_2 - T)$$

where $Vo$ is the indicating output voltage;
where $T_2$ is the temperature of the element $A_4$ at balance;
where $R_1$ is the sensor $A_4$ electrical resistance at balance;

In these equations $T_1$, $T_2$ $k$ R are known and fixed by the feedback in normal operation of the measuring system.

$V_1$ and $Vo$ are measured.

Thus we have two equations with two unknowns T and K which can be solved simultaneously providing a unique measure of T or K. In this system a second voltmeter as indicated by the dotted lines would be added to the circuit of FIGURES 1 to 3, inclusive, to read the output voltage of amplifier 1. The system would function, otherwise, in the same manner as described before.

Another embodiment of the present invention would be that of a mass flow meter. In this embodiment of the invention, as in the others, the sensors $A_4$ and $B_4$ would be made differentially sensitive to the flow by the use of a different operating temperature for each sensor. Each sensor would be held by one of the amplifiers, at a temperature different from the other sensor. The mass flow meter could take the form of any of the circuits shown in FIGURES 1 to 3, inclusive, and similar to the embodiment for measuring the combustibility of a gas, the sensors of the mass flow meter could reside in structure similar to that shown in FIGURE 5. Since the sensors are differentially sensitive to a fluid flowing past them differential heat transfers would occur between the respective surfaces of the sensors and the fluid stream and as such would cause differential variations in the impedance of the sensors. The difference in heat loss between the sensors, or differences in impedance variations between the sensors which would be reflected back into the respective bridge circuits, would be a measure of the mass flow of the fluid past sensors. In this embodiment, indicating devices, such as conventional voltmeters, would be connected to the amplifier as shown in the figure to provide a measurement which would be proportional to the mass flow of the fluid past the sensors. The use of a second voltmeter at the output of the unmonitored amplifier would permit the simultaneous measurement of both fluid velocity and fluid temperature.

It will be understood that the above-described measuring system, and the various embodiments thereof, are merely illustrative of the present invention and that many other modifications and variations may be made therein without departing from the spirit and scope of the present invention.

What is claimed is:

1. A measuring system for measuring a physical quantity, which comprises two sensor means differentially sensitive to said physical quantity and similarly sensitive to the same ambient environmental conditions, means for supplying energy to both sensors to cause each sensor means to achieve respectively a predetermined physical state, said sensors departing differentially from said predetermined physical states upon exposure to said physical quantity, energy means for returning one sensor to its respective predetermined physical state and for correspondingly causing a change in the physical state of said other sensor means, additional means for supplying energy to said other sensor means to cause it to return to its respective predetermined physical state, and measuring means for measuring the amount of energy supplied by said additional energy supply means to provide a measurement of said physical quantity.

2. A measuring system for measuring a physical quantity, comprising two bridge circuits, each circuit being comprised of four impedance arms (some of which may be shared by both bridges) with each arm including an impedance element, one of the four impedance elements in each circuit being many times more sensitive to the physical quantity to be measured than the remaining circuit impedance elements and said more sensitive impedance elements being differentially sensitive to said physical quantity, said more sensitive elements being exposed to the same ambient environmental conditions and to said physical quantity, energy supply means connected to both circuits to place each of said circuits in a near balance condition when said energy supply means has been energized, prior to the exposure to said physical quantity, said more sensitive elements upon exposure to said physical quantity being effective to differentially disturb the near balance conditions of said bridge circuits, said energy supply means including means to return one of said bridge circuits to said near balance condition upon the disturbance thereof and for causing a change in the condition of said other bridge circuit, additional energy supply means to return the other of said bridge circuits to said near balance condition, upon a change in the condition thereof and means for measuring the energy supplied by said additional energy supply means to indicate the measure of said physical quantity.

3. A measuring circuit for measuring a physical quantity, comprising first and second bridge circuits, each circuit being comprised of four impedance arms with each arm including an impedance element, one of the impedance elements in each circuit being many times more impedance sensitive to variations in temperature than the remaining circuit impedance elements, and said more sensitive impedance element of said first circuit being more sensitive to said physical quantity than the more sensitive impedance element of said second circuit, means for supplying a variable amplitude voltage to both of said circuits causing current to flow through each of said more sensitive impedance elements, said current flow heating said more sensitive elements to a temperature which varies the impedance thereof to a value which provides a near balance condition in each of said bridge circuits, said more sensitive impedance elements being adapted to be exposed to the same ambient environmental conditions and to said physical quantity whereupon the temperatures and hence the impedances of the more sensitive impedance elements are varied differentially thereby disturbing differentially the near balance conditions of said circuits, said variable amplitude voltage means including means when energized, to supply voltage to both bridge circuits to return said first bridge circuit to said near balance condition and to change the condition of said second bridge circuit, additional means supplying a variable amplitude voltage to said second bridge circuit said additional means causing a current to flow through the more sensitive impedance element of said second bridge circuit, said circuit thereby varying the temperature and thus the impedance of said second bridge circuit to return said circuit to said near balance condition, and means connected to said additional voltage supply means for measuring the voltage supplied thereby to indicate the measure of said physical quantity.

4. A measuring system for measuring a physical quantity, comprising first and second bridge circuits, each circuit being comprised of four impedance arms, each arm including an impedance element therein, one of the four impedance elements in each circuit being many times more impedance-sensitive to temperature than the remaining circuit impedance elements, and the more sensitive impedance of said first circuit being more sensitive to the physical quantity to be measured than the more sensitive impedance element of said second circuit, means to expose said more sensitive impedance elements to the same ambient environmental conditions and to said physical quantity, a pair of input terminals located at opposite corners of each of the bridge circuits, a pair of output terminals located at the other opposite corners of each bridge circuit, a first variable output amplifier having its input connected to the output terminals of the first bridge circuit and having its output connected to the input terminals of both bridge circuits, a second variable output amplifier having its input connected to the output terminals of the second bridge circuit and having its output connected to the input terminals of the second bridge circuit, and indicating means connected to said second amplifier for providing a measurement of said physical quantity.

5. A measuring system according to claim 4 wherein one of said amplifiers is an AC amplifier and the other of said amplifiers is a DC amplifier, whereby the power supplied to said systems by said amplifiers is summed in the more sensitive impedence element of said second bridge circuit.

6. A measuring system for measuring the combustibility of a gas mixture which comprises a chamber for permitting the passage therethrough of said gas mixture, first and second bridge circuits, each circuit being comprised of four impedance arms, each arm including an impedance element therein, one of the four impedance elements in each circuit being many times more impedance-sensitive to temperature than the remaining circuit impedance elements, said more sensitive impedance element of said first bridge circuit being more catalytic to the oxidation of said gas mixture than the more sensitive impedance element of said second bridge circuit, said more sensitive impedance elements residing within said chamber, a pair of input terminals located at opposite corners of each of the bridge circuits, a pair of output terminals located at the other opposite corners of each bridge circuit, a first variable output amplifier having its input connected to the output terminals of the first bridge circuit and having its output connected to the input terminals of both bridge circuits, a second amplifier having its input connected to the output terminals of the second bridge circuit and having its output connected to the input terminals of the second bridge circuit, and indicating means connected to said second amplifier for providing a measure of the combustibility of said gas mixture.

7. A measuring system for measuring incident thermal radiation, comprising first and second bridge circuits, each circuit being comprised of four impedance arms each arm including an impedance element therein, one of the four impedance elements in each circuit being many times more sensitive to incident thermal radiation than the remaining circuit impedance elements, the more sensitive impedance element of said first circuit being more sensitive to said radiation than the more sensitive impedance element of said second circuit, said more sensitive impedance elements being adapted to be exposed to the same ambient environment and to a source of incident thermal radiation, a pair of input terminals located at opposite corners of each of the bridge circuits, a pair of output terminals located at the other opposite corners of each bridge circuit, a first variable output amplifier having its input connected to the output terminals of the first bridge circuit and having its output connected to the input terminals of both bridge circuits, a second variable output amplifier having its input connected to the output terminals of the second bridge circuit and having its output connected to the input terminals of the second bridge circuit, and indicating means connected to said second amplifier for providing a measurement of said source of incident thermal radiation.

8. A measuring system for measuring voltage, comprising first and second bridge circuits, each circuit being comprised of four impedance arms, each arm including an impedance element therein, one of the four impedance elements in each circuit being many times more impedance-sensitive to temperature than the remaining circuit impedance elements, said more sensitive impedance elements being subjected to the same bias voltage and the more sensitive impedance of the first bridge circuit being subjected to an unknown source of voltage, a pair of input terminals located at opposite corners of each of the bridge circuits, a pair of output terminals located at the other opposite corners of each bridge circuit, a first variable output amplifier having its input connected to the output terminals of the first bridge circuit and having its output connected to the input terminals of both bridge circuits, a second variable output amplifier having its input connected to the output terminals of the second bridge circuit and having its output connected to the input terminals of the second bridge circuit, and indicating means connected to said second amplifier for providing a measurement of said unknown voltage.

9. A measuring system according to claim 8 wherein each of said more sensitive impedance elements is comprised of two parts which are mechanically and thermally intimately joined but which are separated by an electrical conducting layer which provides a common energizing terminal for each part of the element.

10. A measuring system for measuring temperature or heat, comprising first and second bridge circuits, each circuit being comprised of four impedance arms, each arm including an impedance element therein, one of the four impedance elements in each circuit being many times more impedance-sensitive to temperature than the remaining circuit impedance elements, said more sensitive impedance elements being adapted to be exposed to the same environment and the more sensitive impedance element of said first bridge circuit being more sensitive to the ambient environmental temperature than the more sensitive impedance element of said second bridge circuit, a pair of input terminals located at opposite corners of each of the bridge circuits, a pair of output terminals located at the other opposite corners of each bridge circuit, a first variable output amplifier having its input connected to the output terminals of the first bridge circuit and having its output connected to the input terminals of both bridge circuits, a second variable output amplifier having its input connected to the output terminals of the second bridge circuit and having its output connected to the input terminals of the second bridge circuit, and indicating means connected to each amplifier for providing a measure of said unknown temperature.

11. A measuring system for measuring the mass flow of a fluid, comprising first and second bridge circuits, each circuit being comprised of four impedance arms, each arm including an impedance element therein, one of the four impedance elements in each circuit being many times more impedance sensitive to temperature than the remaining circuit impedance elements, said more sensitive impedance elements being adapted to be exposed to the same ambient environmental conditions and to the flow of said fluid, the more sensitive impedance element of said first bridge circuit being more sensitive to the heat transfer rate associated with the flow of said fluid than the more sensitive impedance element of said second bridge circuit, a pair of input terminals located at opposite corners of each of the bridge circuits, a pair of output terminals located at the other opposite corners of each bridge circuit, a first variable output amplifier having its input connected to the output terminals of the first bridge circuit and having its output connected to the output terminals of both bridge circuits, a second variable ouput amplifier having its input connected to the output terminals of the second bridge circuit and having its output connected to the input terminals of the second bridge circuit, and indicating means connected to said amplifiers for providing a measurement of the mass flow of the fluid.

12. The apparatus of claim 2 wherein each of the bridge circuits have at least one common impedance arm.

13. The apparatus of claim 3 wherein each of the bridge circuits have a plurality of common impedance arms.

14. The apparatus of claim 4 wherein each of the bridge circuits have at least one common impedance arm.

15. The apparatus of claim 6 wherein each of the bridge circuits have a plurality of common impedance arms.

16. The apparatus of claim 10 wherein each of the bridge circuits have a plurality of common impedance arms.

References Cited

UNITED STATES PATENTS

| | | | |
|---|---|---|---|
| 2,759,354 | 8/1956 | Cherry et al. | 73—27 |
| 2,947,938 | 8/1960 | Bennett. | |
| 2,949,765 | 8/1960 | Thayer et al. | 73—27 |
| 3,008,084 | 11/1961 | Cotton. | |

RICHARD C. QUEISSER, *Primary Examiner.*

C. I. McCLELLAND, *Assistant Examiner.*

U.S. Cl. X.R.

323—75

UNITED STATES PATENT OFFICE
CERTIFICATE OF CORRECTION

Patent No. 3,429,178                                                  February 25, 1969

Enoch J. Durbin

It is certified that error appears in the above identified patent and that said Letters Patent are hereby corrected as shown below:

Column 2, line 27, "Aeronautical Engineering Review" should be italicized. Column 5, line 58, "efficiently" should read -- sufficiently --. Column 6, line 53, "known" should read -- shown --. Column 7, line 14, after "is" insert a comma; line 66, "circiuts" should read -- circuits --. Column 8, line 32, after "will" insert a comma. Column 9, line 23, "dependent of the ambient temperature. However, since the" should be cancelled line 24, before "to" insert -- input to bridge circuit B varies with the heat input due --. Column 11, line 31, cancel "the". Column 13, line 24, cancel "(some of which may be shared by both bridges)"; line 29, after "elements" insert a comma. Column 14, line 68, after "arms" insert a comma.

Signed and sealed this 7th day of April 1970.

(SEAL)
Attest:

EDWARD M. FLETCHER, JR.                            WILLIAM E. SCHUYLER, JR.
Attesting Officer                                        Commissioner of Patents